United States Patent
Yuh-Ren et al.

(10) Patent No.: US 11,706,683 B2
(45) Date of Patent: Jul. 18, 2023

(54) WIRELESS ROAMING METHOD AND DEVICE, STORAGE MEDIUM, AND ACCESS POINT DEVICE

(71) Applicant: SPREADTRUM COMMUNICATIONS (SHANGHAI) CO., LTD., Shanghai (CN)

(72) Inventors: Jauh Yuh-Ren, Shanghai (CN); Yanchao Xu, Shanghai (CN); Qinghua Yu, Shanghai (CN); Long Wang, Shanghai (CN)

(73) Assignee: SPREADTRUM COMMUNICATIONS (SHANGHAI) CO., LTD., Shanghai (CN)

(*) Notice: Subject to any disclaimer, the term of this patent is extended or adjusted under 35 U.S.C. 154(b) by 683 days.

(21) Appl. No.: 16/320,930

(22) PCT Filed: Jan. 22, 2019

(86) PCT No.: PCT/CN2019/072624
§ 371 (c)(1),
(2) Date: Jan. 25, 2019

(87) PCT Pub. No.: WO2020/124731
PCT Pub. Date: Jun. 25, 2020

(65) Prior Publication Data
US 2021/0337454 A1    Oct. 28, 2021

(30) Foreign Application Priority Data
Dec. 21, 2018 (CN) .......................... 201811571160.6

(51) Int. Cl.
*H04W 36/32* (2009.01)
*H04W 36/00* (2009.01)
(Continued)

(52) U.S. Cl.
CPC .............. *H04W 36/32* (2013.01); *H04W 8/12* (2013.01); *H04W 36/00837* (2018.08); *H04W 36/08* (2013.01)

(58) Field of Classification Search
CPC ....... H04W 36/32; H04W 36/08; H04W 8/12; H04W 36/00837
See application file for complete search history.

(56) References Cited

U.S. PATENT DOCUMENTS 8,155,081 B1    4/2012  Mater et al.
8,583,122 B2 *  11/2013 Klockar ............ H04W 36/0055
                                                        455/438
(Continued)

FOREIGN PATENT DOCUMENTS

CN    101466118 A    6/2009
CN    102752823 A   10/2012
(Continued)

*Primary Examiner* — Marisol Figueroa
(74) *Attorney, Agent, or Firm* — Blank Rome LLP

(57) ABSTRACT

A wireless roaming method and an apparatus, a storage medium and an access point device are disclosed. The wireless roaming method comprises: receiving, from an overlapping access point, first signal strength indication information that describes signal strength when a station transmits a data packet to the overlapping access point via a current channel, wherein the coverage of the overlapping access point overlaps with that of a current access point, the station accesses to the current access point, and the current access point operates on the current channel; measuring second signal strength information that describes signal strength when the station transmits a data packet to the current access point via the current channel; and sending the first signal strength indication information and the second signal strength indication information to the station, and/or generating a switching instruction based on the first signal strength indication information and the second signal (Continued)

strength indication information and sending at least the switching instruction to the station. The technical solution of the present disclosure can improve the efficiency of wireless roaming.

16 Claims, 4 Drawing Sheets

(51) Int. Cl.
  *H04W 8/12* (2009.01)
  *H04W 36/08* (2009.01)

(56) References Cited

U.S. PATENT DOCUMENTS

| | | | |
|---|---|---|---|
| 9,137,727 B2 * | 9/2015 | Kulkarni | H04W 48/02 |
| 2009/0303893 A1 * | 12/2009 | Lee | H04L 1/1858 |
| | | | 370/252 |
| 2012/0327898 A1 | 12/2012 | Lu | |
| 2015/0092685 A1 * | 4/2015 | Lee | H04L 5/0051 |
| | | | 370/329 |
| 2016/0270118 A1 * | 9/2016 | He | H04W 74/06 |
| 2018/0241450 A1 * | 8/2018 | Shukla | H04L 61/6022 |

FOREIGN PATENT DOCUMENTS

| | | |
|---|---|---|
| CN | 104703234 A | 6/2015 |
| CN | 104980987 A | 10/2015 |
| CN | 105208614 A | 12/2015 |
| CN | 107079360 A | 8/2017 |
| CN | 107182098 A | 9/2017 |
| CN | 107295559 A | 10/2017 |
| CN | 108200614 A | 6/2018 |
| CN | 108200615 A | 6/2018 |
| CN | 108235395 A | 6/2018 |
| CN | 108235395 A | 6/2018 |
| CN | 108924888 A | 11/2018 |
| CN | 108337707 A | 10/2020 |

* cited by examiner

WIRELESS ROAMING METHOD AND DEVICE, STORAGE MEDIUM, AND ACCESS POINT DEVICE

RELATED APPLICATIONS

This application is a U.S. National Stage Application based on International Application No. PCT/CN2019/072624, filed on Jan. 22, 2019, which claims priority to Chinese Patent Application No. 201811571160.6, filed on Dec. 21, 2018. The entire contents of those applications are incorporated herein by reference.

TECHNICAL FIELD

The present disclosure relates to the technical field of communication, and particularly relates to a wireless roaming method, a wireless roaming apparatus, a storage medium and an access point device.

BACKGROUND

In a Wi-Fi roaming scenario, a station (STA) accesses to an original access point (AP), and the original AP uses an original channel. When a new AP uses a channel different from the original channel used by the original AP, the station will perform a channel scan, switch to the channel used by the new AP, and check if the current switch is valid.

However, the STA may switch to the new channel too early, find that signals via the original channel are better, and then switch back to the original channel. Alternatively, the STA may switch to the new channel too late. Channel scanning and frequent switching of channels would take time, resulting in Wi-Fi roaming delays.

SUMMARY

The present disclosure aims to solve the technical problem of how to improve the efficiency of wireless roaming.

To solve the technical problem, according to an embodiment of the present disclosure, there is provided a roaming method comprising: receiving, from an overlapping access point, first signal strength indication information that describes signal strength when a station transmits a data packet to the overlapping access point via a current channel, wherein the overlapping access point shares a common area in coverage with a current access point, the station connects to the current access point, and the current access point operates on the current channel; detecting second signal strength information that describes signal strength when the station transmits a data packet to the current access point via the current channel; and sending the first signal strength indication information and the second signal strength indication information to the station, additionally or alternatively (and/or) generating a switching instruction based on the first signal strength indication information and the second signal strength indication information and sending at least the switching instruction to the station.

Optionally, sending the first signal strength indication information and the second signal strength indication information to the station, and/or generating a switching instruction based on the first signal strength indication information and the second signal strength indication information, and sending at least the switching instruction to the station comprises: determining the type of the station; and in response to the type of the station as a boundary station, sending the first signal strength indication information and the second signal strength indication information to the station, and/or generating a switching instruction based on the first signal strength indication information and the second signal strength indication information and sending at least the switching instruction to the station.

Optionally, determining the type of the station comprises: calculating the difference between the first signal strength indication information and the second signal strength indication information is lower than a preset value; and if the difference is lower than a preset threshold, determining the station as a boundary station.

Optionally, generating a switching instruction based on the first signal strength indication information and the second signal strength indication information comprises: generating the switching instruction so as to instruct the station to switch to the overlapping access point at least if the signal strength indicated by the first signal strength indication information is greater than signal strength indicated by the second signal strength indication information.

Optionally, generating the switching instruction at least if signal strength indicated by the first signal strength indication information is greater than signal strength indicated by the second signal strength indication information comprises: generating the switching instruction if signal strength indicated by the first signal strength indication information is greater than signal strength indicated by the second signal strength indication information and if signal strength indicated by the second signal strength indication information is lower than a preset value.

Optionally, sending at least the switching instruction to the station comprises: sending to the station the switching instruction and information of a channel used by the overlapping access point.

Optionally, receiving, from an overlapping access point, first signal strength indication information is preceded by notifying the overlapping access point of a time at which the station sends a data packet so that the overlapping access detects the first signal strength indication information at the time.

To solve the aforementioned technical problem, according to an embodiment of the present disclosure, there is provided a wireless roaming apparatus comprising: a signal strength indication information receiving module adapted to receive, from an overlapping access point, first signal strength indication that describes signal strength when a station transmits a data packet to the overlapping access point via a current channel, wherein the overlapping access point shares a common area with the current access point in coverage, the station connects to the current access point, and the current access point operates on the current channel; a signal strength indication information detecting module adapted to detect second signal strength information that describes signal strength when the station transmits a data packet to the current access point via the current channel; and a transmission module adapted to send the first signal strength indication information and the second signal strength indication information to the station, and/or generate a switching instruction based on the first signal strength indication information and the second signal strength indication information, and send at least the switching instruction to the station.

According to an embodiment of the present disclosure, there is also provided a storage medium storing thereon computer instructions that when running, carries out the steps of the wireless roaming method.

According to an embodiment of the present disclosure, there is also provided an access point device including a memory and a processor, wherein the memory stores computer instructions runnable on the processor, and when executing the computer instructions, the processor carries out the steps of the wireless roaming method.

An embodiment of the present technical solution receives, from an overlapping access point, first signal strength indication information that describes signal strength when a station transmits a data packet to the overlapping access point via a current channel, wherein the coverage of the overlapping access point overlaps with that of a current access point, the station accesses to the current access point, and the current access point operates on the current channel; measures second signal strength information that describes signal strength when the station transmits a data packet to the current access point via the current channel; and sends the first signal strength indication information and the second signal strength indication information to the station, and/or generates a switching instruction based on the first signal strength indication information and the second signal strength indication information, and sends at least the switching instruction to the station. As compared with the prior art, the technical solution of the embodiments of the present disclosure are advantageous in the following: in such a technical solution, the strength of a signal transmitted between a station and an overlapping access point can be obtained by receiving first signal strength indication information from the overlapping access point. Second signal strength indication information obtained by detecting a current access point can indicate the strength of the signal transmitted between the station and the current access point. Sending the first signal strength indication information and the second signal strength indication information to the station may help the station decide whether to switch between the access points. Generating a switching instruction based on the strength indication information and sending the same to the station enables the station to switch between the access points. The technical solution may thereby ensure the effective switching. That is, it may avoid roaming delays caused by the channel scanning and frequent channel switchings in the prior art and make the wireless roaming more efficient. As a result, it improves user experience.

An embodiment of the present technical solution further determines the type of the station; and in response to the type of the station being a boundary station, sends the first signal strength indication information and the second signal strength indication information to the station, and/or generates a switching instruction based on the first signal strength indication information and the second signal strength indication information and sends at least the switching instruction to the station. In such a technical solution, as a boundary station is a station existing in an overlap area of the coverage of two access points, only the boundary station needs to determine whether to switch between access points. Therefore, by determining the type of the station and sending only the first signal strength indication information and the second signal strength indication information and/or the switching instruction to the boundary station, it is possible to reduce the amount of data transmitted by the current access point and thereby to improve the efficiency of the access point.

Furthermore, an embodiment of the present technical solution notifies the overlapping access point of a time at which the station sends a data packet, so that the overlapping access measures and determines the first signal strength indication information at said time. In such a technical solution, the current access point, by notifying the overlapping access point of a time at which the station sends a data packet, allows the overlapping access point monitor the data packet at said time and obtain the first signal strength indication information, thereby avoiding the overlapping access point to continuously monitor the data packet and reducing power consumption.

DETAILED DESCRIPTION

As described in the BACKGROUND, in the prior art, the STA may switch to a new channel too early, find that signals via the original channel are better, and then switches back to the original channel. Alternatively, the STA may switch to the new channel too late. Channel scanning and frequent switching of channels would take time, resulting in Wi-Fi roaming delays.

In one technical solution of the present disclosure, signal strength of data transmission between a station and an overlapping access point can be obtained by receiving first signal strength indication information from the overlapping access point. Second signal strength indication information measured by a current access point can indicate signal strength of data transmission between the station and the current access point. The station can be assisted in deciding whether to perform switching of access points by sending the first signal strength indication information and the second signal strength indication information to the station. A switching instruction is generated based on the signal strength indication information and is sent to the station, then the station can be instructed to perform the switching of access points. Thus the technical solution may ensure the validity of the switching of access points, avoid roaming delays caused by channel scanning and frequent switching of channels in the prior art, and improve the efficiency of wireless roaming, thereby improving the user experience.

To make the above objectives, features, and advantages of the present disclosure more apparent and understandable, specific embodiments of the present disclosure will be described hereinafter in detail in conjunction with the drawings.

Figure 1:
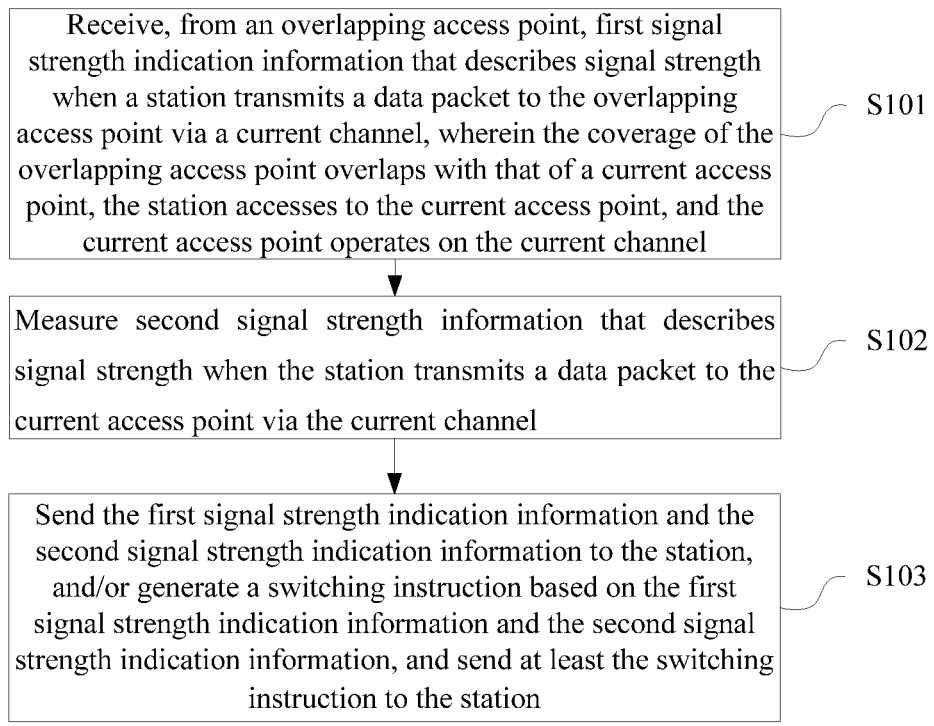
FIG. 1 is a flowchart of a wireless roaming method according to an embodiment of the present disclosure.

FIG. 1 is a flowchart of a wireless roaming method according to an embodiment of the present disclosure.

The wireless roaming method shown in FIG. 1 comprises the following steps.

In step S101, the first signal strength indication information is received from an overlapping access point, the first signal strength indication information indicating the signal strength when a station transmits a data packet to the overlapping access point via a current channel, wherein coverage of the overlapping access point overlaps with that of the current access point, the station accesses to the current access point, and the current access point operates on the current channel.

In step S102, the second signal strength information is measured, the second signal strength information indicating the signal strength when the station transmits a data packet to the current access point via the current channel.

In step S103, the first signal strength indication information and the second signal strength indication information are sent to the station, and/or a switching instruction is generated based on the first signal strength indication information and the second signal strength indication information, and at least the switching instruction is sent to the station.

It should be noted that the serial numbers of the respective steps in this embodiment are not meant to limit the order of carrying out the steps.

In this embodiment, the steps of the method shown in FIG. 1 may be performed by a current access point in a wireless network. The current access point refers to an access point that is connected to the station, that is, the station accesses to the current access point. The current access point and an overlapping access point share the same Service Set Identifier (SSID). The station may perform switching between the current access point and the overlapping access point so as to maintain an uninterrupted network connection for wireless roaming.

Specifically, an overlapping access point may be referred to as an Overlapping Basic Service Set (OBSS) of a current access point. The current access point may also be referred to as an OBSS of the overlapping access point.

In a specific implementation, a current access point operates on a current channel, and an overlapping access point operates on a channel different from the current channel. That is to say, the frequency band of the current channel is different from that of the channel used by the overlapping access point.

The overlapping access point has the ability of measuring the first signal strength indication information of a data packet of the station on the current channel. Specifically, a signal monitoring device, e.g., a packet capture device, may be provided at the overlapping access point to perform interception, retransmission and the like on the data packet transmitted between the station and the current access point. The first signal strength indication information is measured by using the intercepted data packet.

In a specific implementation, the first signal strength indication information and the second signal strength indication information may be Received Signal Strength Indicator (RSSI) values. Specifically, the signal monitoring device at the overlapping access point may be set to monitor the channel used by the known OBSS and measure the RSSI value in sending the data packet by the OBSS station.

In a non-limiting example, the overlapping access point may continuously measure the first signal strength indication information of the data packet of the station on the current channel. The overlapping access point may also periodically measure the first signal strength indication information of the data packet of the station on the current channel.

In the specific implementation of step S102, the current access point can measure second signal strength indication information of the data packet of the station on the current channel.

The first signal strength indication information may indicate signal strength of data transmission between the station and the overlapping access point, and the second signal strength indication information may indicate signal strength of data transmission between the station and the current access point. In other words, whether or not switching of the station from the current access point to the overlapping access point is performed can be determined based on the first signal strength indication information and the second signal strength indication information.

In a specific implementation, the current access point can generate a switching instruction and sends the same to the station, and the station directly performs the switching based on the switching instruction or maintains a connection with the current access point. The current access point can also directly send the first signal strength indication information and the second signal strength indication information to the station, and the station decides whether to perform the switching from the current access point to the overlapping access point.

In the embodiment of the present disclosure, the strength of a signal transmitted between a station and an overlapping access point can be obtained by receiving first signal strength indication information from the overlapping access point. Second signal strength indication information obtained by detecting a current access point can indicate the strength of a signal transmitted between the station and the current access point. Sending the first signal strength indication information and the second signal strength indication information to the station may help the station decide whether to switch between the access points. Generating a switching instruction based on the strength indication information and sending it to the station enables the station to switch between the access points. The embodiment thereby may ensure an effective switching. That is, it may avoid roaming delays caused by the channel scanning and frequent channel switches in the prior art and make the wireless roaming more efficient. As a result, it improves user experience.

Figure 2:
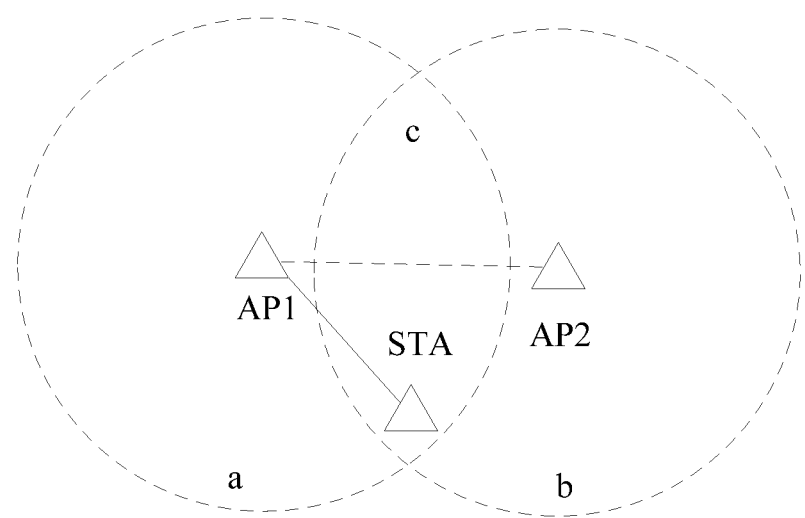
FIG. 2 is a schematic diagram of a typical application scenario of the present disclosure.

In a non-limiting example, further referring to FIG. 2, a station STA accesses to an access point AP1. The coverage of the access point AP1 is area "a", the coverage of the access point AP2 is area "b", and the area "a" overlaps with the area "b" in area "c". In this scenario, the access point AP1 is the current access point, and the access point AP2 is the overlapping access point. The access point AP1 operates on channel A and the access point AP2 operates on channel B.

The access point AP2 intercepts a data packet transmitted between the access point AP1 and the station STA, measures RSSI1, and sends the RSSI1 to the access point AP1.

The access point AP1 measures RSSI2 using a data packet transmitted between itself and the station STA.

The access point AP1 may generate a switching instruction based on RSSI1 and RSSI2, instructing the station STA to perform the switching from the access point AP1 to the access point AP2.

Optionally, the access point AP1 directly sends RSSI1 and RSSI2 to the station STA, so that the station STA determines whether to perform the switching from the access point AP1 to the access point AP2 based on RSSI1 and RSSI2.

Optionally, the access point AP1 directly sends RSSI1, RSSI2 and the switching instruction to the station STA, so that the station STA determines whether to perform the switching from the access point AP1 to the access point AP2 based on RSSI1, RSSI2 and the switching instruction.

It should be understood by those skilled in the art that when the station STA accesses to the access point AP2, the access point AP2 is the current access point and the access point AP1 is the overlapping access point.

In a non-limiting embodiment of the present disclosure, step S103 shown in FIG. 1 may comprise: determining the type of the station; in response to the type of the station being a boundary station, sending the first signal strength indication information and the second signal strength indication information to the station, and/or generating a switching instruction based on the first signal strength indication information and the second signal strength indication information and sending at least the switching instruction to the station.

In this embodiment, a boundary station is a station existing in an overlapping area of coverage of two access points, that is, an overlapping area of the coverage of the current access point and the coverage of the overlapping access point. Only a boundary station needs to determine whether to switch between access points.

The current access point may determine whether the station to which it is connected is a boundary station. By determining the type of the station and sending only the first signal strength indication information and the second signal strength indication information and/or the switching instruction to the boundary station, it is possible to reduce the amount of data transmitted by the current access point and thereby to improve the efficiency of the access point.

In a specific implementation, whether or not the station is a boundary station may be determined by the following way: if the absolute value of a difference between the first signal strength indication information and the second signal strength indication information is lower than a preset value, the station is determined as a boundary station.

For example, continuing to refer to FIG. 2, the preset value TH1 is 10 dB, the first signal strength indication information AP2_RSSI@STA_TX is −80 dBm, the second signal strength indication information AP1_RSSI@STA_TX is −75 dBm, and the absolute value Delta RSSI of the difference between them is abs(−75−(−80))=5, which is smaller than the preset value TH1. The station STA is thus determined as a boundary station.

It should be noted that the preset value may be adaptively set according to an actual application scenario, and there is no limitations on this in the embodiments of the present disclosure.

In a non-limiting embodiment of the present disclosure, step S103 shown in FIG. 1 may comprise: generating the switching instruction so as to instruct the station to switch to the overlapping access point, at least in response to the signal strength indicated by the first signal strength indication information being greater than the signal strength indicated by the second signal strength indication information.

In this embodiment, if the signal strength indicated by the first signal strength indication information is greater than the signal strength indicated by the second signal strength indication information, which indicates that the path loss between the station and the overlapping access point is much smaller and thus the signal of data transmission is much better, the switching instruction is generated, instructing the station to switch from the current access point to the overlapping access point.

Further, in response to the signal strength indicated by the first signal strength indication information being greater than the signal strength indicated by the second signal strength indication information and the signal strength indicated by the second signal strength indication information being lower than a preset value, the switching instruction is generated.

In this embodiment, in order to avoid frequent switchings by the station, such as the case where the station is switched from the current access point to the overlapping access point if the RSSI value of the overlapping access point is higher than that of the current access point, a switching instruction may be generated until the signal strength indicated by the first signal strength indication information is greater than the signal strength indicated by the second signal strength indication information and the signal strength indicated by the second signal strength indication information is lower than a preset value.

In a non-limiting embodiment of the present disclosure, step S103 shown in FIG. 1 may comprise: sending to the station the switching instruction and information of a channel used by the overlapping access point.

In this embodiment, since the overlapping access point and the current access point use different channels, the current access point, when sending the switching instruction to the station, also needs to indicate information of the channel used by the overlapping access point.

For example, continuing to refer to FIG. 2, the access point AP2 uses channel B. When sending the switching instruction to the station STA, the access point AP1 sends to the station STA not only the switching instruction but also the information indicating that channel B is used by the access point AP2.

In a non-limiting embodiment of the present disclosure, before step S101 shown in FIG. 1, the method may further comprise: notifying the overlapping access point of a time at which the station sends a data packet, so that the overlapping access point measures the first signal strength indication information at said time.

In this embodiment, when there are multiple current access points in the coverage of the overlapping access point, the multiple current access points are respectively connected to multiple stations. A simple embodiment of the overlapping access point is that the overlapping access point has only one set of detecting device, so signal detection may only be performed on data packets transmitted in the current channel used by one current access point at the same time.

In such a simple embodiment, in order to enable the signal detection by the same overlapping access point on multiple current access points with the stations connected thereto, each of the current access points may notify the overlapping access point of a time at which the station connected to the current access point sends a data packet, so that the overlapping access point measures the first signal strength indication information at said time and further measures the first signal strength indication information of the data packs for the different stations at different times.

Figure 3:
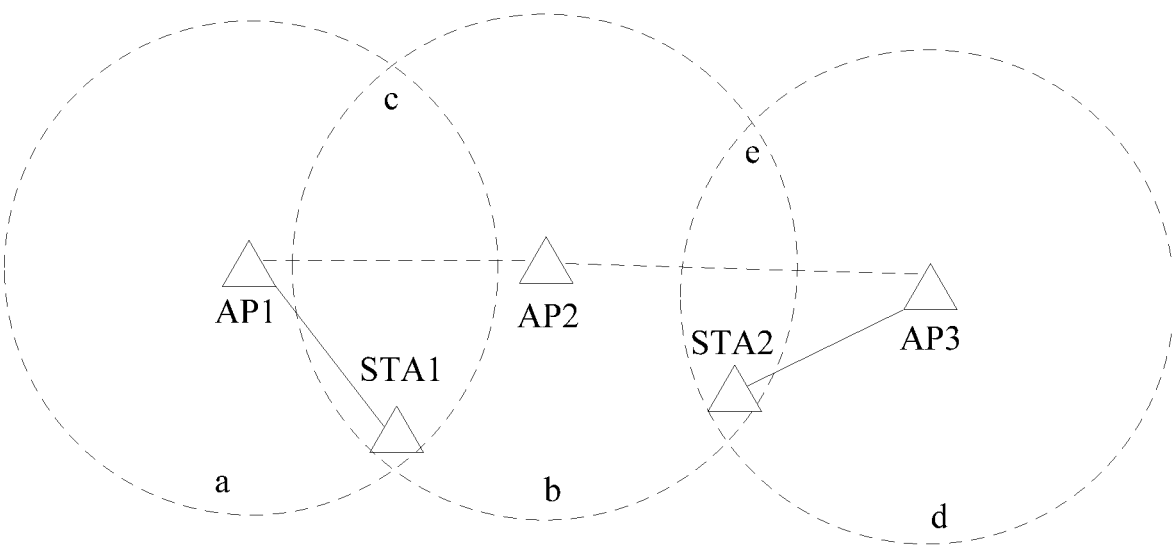
FIG. 3 is a schematic diagram of another typical application scenario of the present disclosure.

In a typical application scenario of the present disclosure, referring to FIG. 3, the coverage of the access point AP2 overlaps with those of access points AP1 and AP3 respectively, i.e., there are an overlapping area "c" and an overlapping area "d". The access point AP1 is connected to the station STA1, and the access point AP3 is connected to the station STA2. The access point AP2 is an overlapping access point, and the access points AP1 and AP3 are current access points. The access point AP1 operates on channel A, and the access point AP3 operates on channel C.

The access point AP1 may notify the access point AP2 of time T1 at which the access point AP1 sends a data packet to the station STA'. Thus, the access point AP2 can measure the RSSI value of the data packet for the access point STA1 on channel A at time T1.

The access point AP3 may notify the access point AP2 of time T2 at which the access point AP3 sends a data packet to the station STA2. Thus, the access point AP2 can measure the RSSI value of the data packet for the access point STA2 on channel C at time T2.

It should be noted that the foregoing application scenarios are described by taking one overlapping access point and two current access points as an example. However, the actual number of overlapping access points and current access points may be adjusted depending on actual application scenarios. The present disclosure is not limited thereto.

Figure 4:
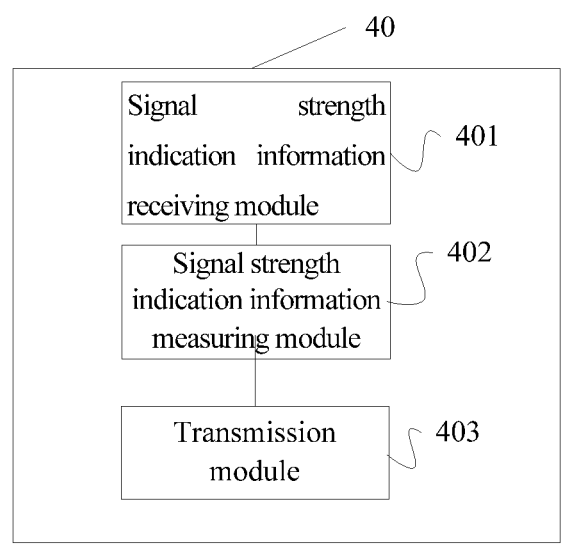
FIG. 4 is a schematic structural diagram of a wireless roaming apparatus according to an embodiment of the present disclosure.

Referring to FIG. 4, in the embodiment of the present disclosure, there is further provided a wireless roaming apparatus 40. The wireless roaming apparatus 40 can be provided at the current access point. The wireless roaming apparatus 40 may include a signal strength indication information receiving module 401, a signal strength indication information measuring module 402 and a transmission module 403.

The signal strength indication information receiving module 401 is adapted to receive, from an overlapping access point, the first signal strength indication information that describes signal strength when a station transmits a data packet to the overlapping access point via a current channel, wherein the coverage of the overlapping access point overlap with that of the current access point, the station accesses to the current access point, and the current access point operates on the current channel. The signal strength indication information measuring module 402 is adapted to measure the second signal strength information that describes signal strength when the station transmits a data packet to the current access point via the current channel. The transmission module 403 is adapted to send the first signal strength indication information and the second signal strength indication information to the station, and/or generate a switching instruction based on the first signal strength indication information and the second signal strength indication information, and send at least the switching instruction to the station.

In the embodiment of the present disclosure, the strength of a signal transmitted between a station and an overlapping access point can be obtained by receiving first signal strength indication information from the overlapping access point. Second signal strength indication information obtained by detecting a current access point can indicate the strength a signal transmitted between the station and the current access point. Sending the first signal strength indication information and the second signal strength indication information to the station may help the station decide whether to switch between the access points. Generating a switching instruction based on the strength indication information and sending it to the station enables the station to switch between the access points. The embodiment thereby may ensure an effective switching. That is, it may avoid roaming delays caused by the channel scanning and frequent channel switches in the prior art and make the wireless roaming more efficient. As a result, it improves user experience.

For more details on the working principle and working mode of the wireless roaming apparatus 40, see the related description of FIG. 1 to FIG. 3; and details thereof are not repeated herein.

Figure 5:
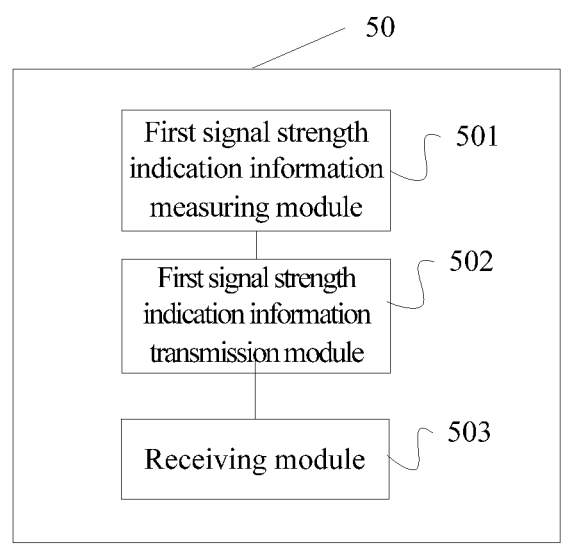
FIG. 5 is a schematic structural diagram of another wireless roaming apparatus according to an embodiment of the present disclosure.

Referring to FIG. 5, the wireless roaming apparatus 50 can be provided at an overlapping access point. The coverage of the overlapping access point overlaps with that of the current access point, and the current access point operates on the current channel. The wireless roaming apparatus 50 may include a first signal strength indication information measuring module 501 and a first signal strength indication information transmission module 502.

The first signal strength indication information measuring module 501 is adapted to receive data packets sent by the station via the current channel and measure first signal strength indication information. The first signal strength indication information transmission module 502 is adapted to send the first signal strength indication information to the current access point.

Further, the wireless roaming apparatus 50 may further include a receiving module 503 adapted to receive information sent by the current access point, the information including a time at which the station sends a data packet.

It can be understood that the current access point can serve as an overlapping access point for other access points. In that case, the current access point may also be provided with the wireless roaming apparatus 50 shown in FIG. 5.

According to an embodiment of the present disclosure, there is further provided a storage medium storing thereon computer instructions that when running, carries out the steps of the method shown in FIG. 1. The storage medium may include a ROM, a RAM, a magnetic disk, an optical disk, or the like. The storage medium may also include a non-volatile memory or non-transitory memory or the like.

According to an embodiment of the present disclosure, there is further provided an access point device, which may include a memory and a processor, wherein the memory stores computer instructions runnable on the processor. When executing the computer instructions, the processor carries out the steps of the method illustrated in FIG. 1.

Although the present disclosure has been described as above, the present disclosure is not limited thereto. Various changes and modifications can be made by those skilled in the art without departing from the spirit and scope of the present disclosure. Therefore, the scope of protection of the present disclosure should be defined by the appended claims.

What is claimed is:

1. A roaming method comprising:
   receiving, by a current access point and from an overlapping access point, first signal strength indication information that describes signal strength that a station transmits of a data packet to the overlapping access point via a current channel, wherein a coverage of the overlapping access point overlaps with that of the current access point, wherein the station accesses to the current access point, and wherein the current access point operates on the current channel;
   detecting, by the current access point, second signal strength indication information that describes signal strength that the station transmits of a data packet to the current access point via the current channel;
   determining, by the current access point, a type of the station; and
   in response to the type of the station being a boundary station located in an overlapping area of the coverage:
   sending, by the current access point, the first signal strength indication information and the second signal strength indication information to the station.

2. The roaming method according to claim 1, further comprising:
   in response to the type of the station being a boundary station:
     generating, by the current access point, a switching instruction based on the first signal strength indication information and the second signal strength indication information; and sending, by the current access point, the switching instruction to the station.

3. The roaming method according to claim 1, wherein said determining the type of the station comprises:
calculating a difference between the first signal strength indication information and the second signal strength indication information and
in response to the absolute value of the difference being lower than a preset threshold, determining the station as the boundary station.

4. The roaming method according to claim 2, wherein said generating a switching instruction based on the first signal strength indication information and the second signal strength indication information comprises:
generating the switching instruction so as to instruct the station to switch to the overlapping access point at least in response to the signal strength indicated by the first signal strength indication information being greater than the signal strength indicated by the second signal strength indication information.

5. The roaming method according to claim 4, wherein said generating the switching instruction at least in response to the signal strength indicated by the first signal strength indication information being greater than the signal strength indicated by the second signal strength indication information comprises:
generating the switching instruction in response to the signal strength indicated by the first signal strength indication information being greater than the signal strength indicated by the second signal strength indication information and the signal strength indicated by the second signal strength indication information being lower than a preset value.

6. The roaming method according to claim 2, wherein said sending the switching instruction to the station comprises:
sending the switching instruction and information of a channel used by the overlapping access point to the station.

7. The roaming method according to claim 1, the method further comprising: before receiving the first signal strength indication information from the overlapping access point, notifying the overlapping access point, by the current access point, of a time at which the station sends a data packet for measuring the first signal strength indication information.

8. A non-transitory storage medium storing thereon computer instructions that when running, wherein the computer instructions cause a processor to:
receive, from an overlapping access point, first signal strength indication information that describes signal strength that a station transmits of a data packet to the overlapping access point via a current channel, wherein the coverage of the overlapping access point overlaps with that of a current access point, wherein the station accesses to the current access point, and wherein the current access point operates on the current channel;
detect second signal strength indication information that describes signal strength that the station transmits of a data packet to the current access point via the current channel;
determine a type of the station; and
in response to the type of the station being a boundary station located in an overlapping area of the coverage:
send the first signal strength indication information and the second signal strength indication information to the station.

9. The storage medium of claim 8, wherein the computer instructions further cause the processor to:

in response to the type of the station being a boundary station:
generate a switching instruction based on the first signal strength indication information and the second signal strength indication information; and
send the switching instruction to the station.

10. An access point device including a memory and a processor, wherein the memory stores computer instructions runnable on the processor, and when executing the computer instructions cause the processor to:
receive, from an overlapping access point, first signal strength indication information that describes signal strength that a station transmits of a data packet to the overlapping access point via a current channel, wherein the coverage of the overlapping access point overlaps with that of a current access point, wherein the station accesses to the current access point, and wherein the current access point operates on the current channel;
detect second signal strength indication information that describes signal strength that the station transmits of a data packet to the current access point via the current channel;
determine a type of the station; and
in response to the type of the station being a boundary station located in an overlapping area of the coverage:
send the first signal strength indication information and the second signal strength indication information to the station.

11. The access point device according to claim 10, wherein the computer instructions further cause the processor to:
in response to the type of the station being a boundary station:
generate a switching instruction based on the first signal strength indication information and the second signal strength indication information and send the switching instruction to the station.

12. The access point device according to claim 11, wherein the computer instructions further cause the processor to:
generate the switching instruction so as to instruct the station to switch to the overlapping access point at least in response to the signal strength indicated by the first signal strength indication information being greater than the signal strength indicated by the second signal strength indication information.

13. The access point device according to claim 12, wherein the computer instructions further cause the processor to:
generate the switching instruction in response to the signal strength indicated by the first signal strength indication information being greater than the signal strength indicated by the second signal strength indication information and the signal strength indicated by the second signal strength indication information being lower than a preset value.

14. The access point device according to claim 11, wherein the computer instructions further cause the processor to:
send the switching instruction and information of a channel used by the overlapping access point to the station.

15. The access point device according to claim 10, wherein the computer instructions further cause the processor to:
notify the overlapping access point of a time at which the station sends a data packet for measuring the first signal strength indication information at said time.

16. The access point device according to claim 10, wherein the computer instructions further cause the processor to:
- calculate a difference between the first signal strength indication information and the second signal strength indication information; and
- in response to the absolute value of the difference being lower than a preset threshold, determine the station as the boundary station.

* * * * *